UNITED STATES PATENT OFFICE.

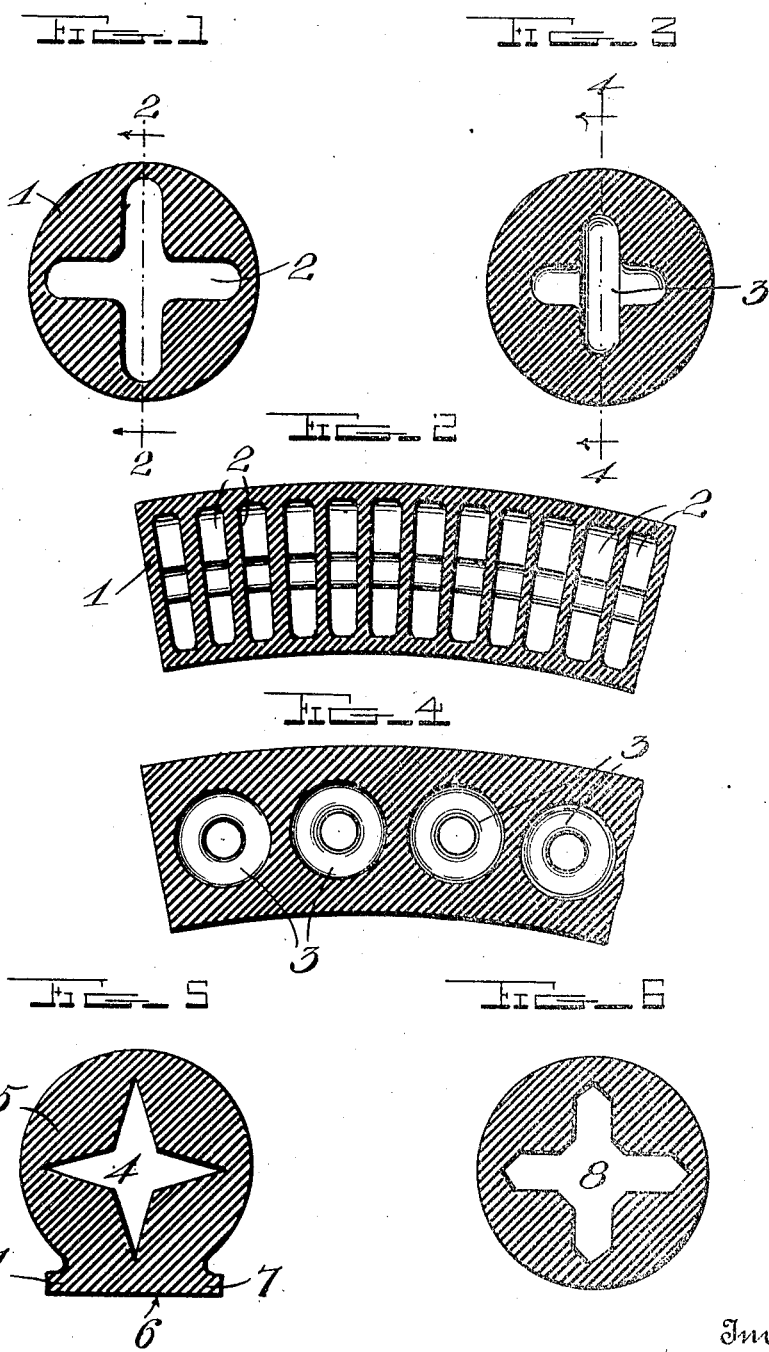

ORVILLE LIVINGSTON LEACH, OF CRANSTON, RHODE ISLAND.

RESILIENT TIRE.

No. 926,338.

Specification of Letters Patent.    Patented June 29, 1909.

Application filed February 9, 1909. Serial No. 476,991.

*To all whom it may concern:*

Be it known that I, ORVILLE L. LEACH, a citizen of the United States, residing at Cranston, in the county of Providence and State of Rhode Island, have invented certain new and useful Improvements in Resilient Tires; and I do declare the following to be a full, clear, and exact description of the invention, such as will enable others skilled in the art to which it appertains to make and use the same.

This invention relates to improvements in tires for vehicle wheels.

The object of the invention is to provide a tire of this character in which all the desirable features of a pneumatic tire are retained and the objectionable features of said tire are eliminated, and which will be as safe and durable as a solid rubber tire without having the objection of this form of tire.

With the foregoing and other objects in view, the invention consists of certain novel features of construction, combination and arrangement of parts as will be more fully described and particularly pointed out in the appended claim.

In the accompanying drawings, Figure 1 is a cross sectional view through a tire constructed in accordance with the invention; Fig. 2 is a perspective view of a section of the tire shown in Fig. 1; Fig. 3 is a cross sectional view of a modified form of the tire; Fig. 4 is a perspective view of a section of the tire constructed as shown in Fig. 3; Fig. 5 is a cross section of another form of tire; Fig. 6 is a similar view of still another modified form of tire.

My improved tire 1 is formed of rubber having a suitable resiliency or elasticity. In the center of the tire is formed a series of independent air tight cells 2, which in Figs. 1 and 2 are shown in the shape of a cross. The arms of the cross shaped cells shown in Figs. 1 and 2 extend to near the periphery of the tire, as shown. The cells are spaced apart by thin partitions of the rubber forming the tire.

The radiating arms of the cross shaped cells extend or project from the center of the tire in four diametrically opposite directions thus giving equal resiliency on all sides of the tire. The angular portions of the solid rubber radiate or point to the center of the cross to prevent the absolute collapse of the tire when under abnormal pressure, while the diameter of the air cell arms of the cross are adequate to furnish a resilient cushion which will prevent concussion and wear and tear of the automobile or other vehicle to which the tires are applied. The form of tire shown in Figs. 3 and 4 of the drawings, is also provided with substantially cross-shaped air cells, said cells 3, however, being more globular in form, thus providing a somewhat stiffer construction of tire than that produced by the attenuated construction of cells, as shown in Figs. 1 and 2 of the drawings.

In Fig. 5 of the drawings, the tire is shown as being provided with star-shaped cells 4.

In the form shown in Fig. 5 of the drawings, the tire 5 is shown as being provided on its inner edge or side with a squared or flat base portion, 6, the ends of which form annular flanges 7. The flanges 7 are adapted to be engaged with the rim of the wheel in the usual manner.

In Fig. 6 of the drawings, is shown another form of air cells 8, said air cells being of cross form similar to that shown in Fig. 1, the cells 8, however, having angular or pointed ends at the end of each of the cross arms of the cell.

In the construction of the tire, the same is preferably formed in longitudinal sections, each of which is semi-cylindrical in cross section and said sections are afterward vulcanized together to form an integral structure. The tire may be of cylindrical shape in cross section or provided with a flat inner surface and attaching flanges as shown in Fig. 5, or in any other desired shape. In using the tire the same may be employed as a core or packing to be placed inside of a sheathing or casing, or in a common pneumatic tire, or the same may be arranged on the rim of the wheel and used as a regular tire, having a shape to fit the rim as hereinbefore stated.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what

I claim as new and desire to secure by Letters-Patent is:

A solid cylindrical tire for vehicle wheels formed of resilient material and having formed therein and throughout its length a series of circumferentially spaced air tight air cells separated by transverse partitions, each air cell having a pair of vertically disposed oppositely extending arms which extend, respectively, toward the inner and outer peripheries of the tire, and a pair of transversely extending arms which extend directly toward opposite sides of the tire.

In testimony whereof I have hereunto set my hand in the presence of two subscribing witnesses.

ORVILLE LIVINGSTON LEACH.

Witnesses:
WILLIAM G. WHEAWILL,
WILLIAM H. O'NEILL.